US010217259B2

(12) United States Patent
Ellis

(10) Patent No.: US 10,217,259 B2
(45) Date of Patent: Feb. 26, 2019

(54) METHOD OF AND APPARATUS FOR GRAPHICS PROCESSING

(71) Applicant: ARM Limited, Cambridge (GB)

(72) Inventor: Sean Tristram LeGuay Ellis, Farnham (GB)

(73) Assignee: Arm Limited, Cambridge (GB)

( * ) Notice: Subject to any disclaimer, the term of this patent is extended or adjusted under 35 U.S.C. 154(b) by 110 days.

(21) Appl. No.: 15/336,693

(22) Filed: Oct. 27, 2016

(65) Prior Publication Data

US 2017/0124748 A1    May 4, 2017

(30) Foreign Application Priority Data

Nov. 2, 2015 (GB) .................................. 1519353.5

(51) Int. Cl.
| | |
|---|---|
| *G06T 11/60* | (2006.01) |
| *G06T 1/20* | (2006.01) |
| *H04N 13/111* | (2018.01) |
| *H04N 13/351* | (2018.01) |
| *H04N 13/00* | (2018.01) |

(52) U.S. Cl.
CPC ................ *G06T 11/60* (2013.01); *G06T 1/20* (2013.01); *H04N 13/111* (2018.05); *H04N 13/351* (2018.05); *H04N 2013/0081* (2013.01)

(58) Field of Classification Search
CPC .. G06T 1/20; G06T 1/60; G06T 11/60; H04N 13/0447; H04N 13/0445; H04N 13/0011; H04N 2013/0081
See application file for complete search history.

(56) References Cited

U.S. PATENT DOCUMENTS

2011/0141235 A1* 6/2011 Tsukagoshi .......... H04N 13/007
348/43
2016/0260241 A1* 9/2016 Jin ........................ G06T 15/005

* cited by examiner

*Primary Examiner* — Maurice L. McDowell, Jr.
*Assistant Examiner* — Donna J. Ricks
(74) *Attorney, Agent, or Firm* — Vierra Magen Marcus LLP

(57) ABSTRACT

When rendering a pair of images representing the same scene from different viewpoints, a displacement that is a measure of the difference between the position of content of the scene to be processed (for the purpose of rendering the pair of images) in the first image and in the second image of the pair of images is determined for each of plural regions that the images are divided into for processing purposes.
The determined displacements are then used to control the order in which the respective regions of the images are rendered.

17 Claims, 9 Drawing Sheets

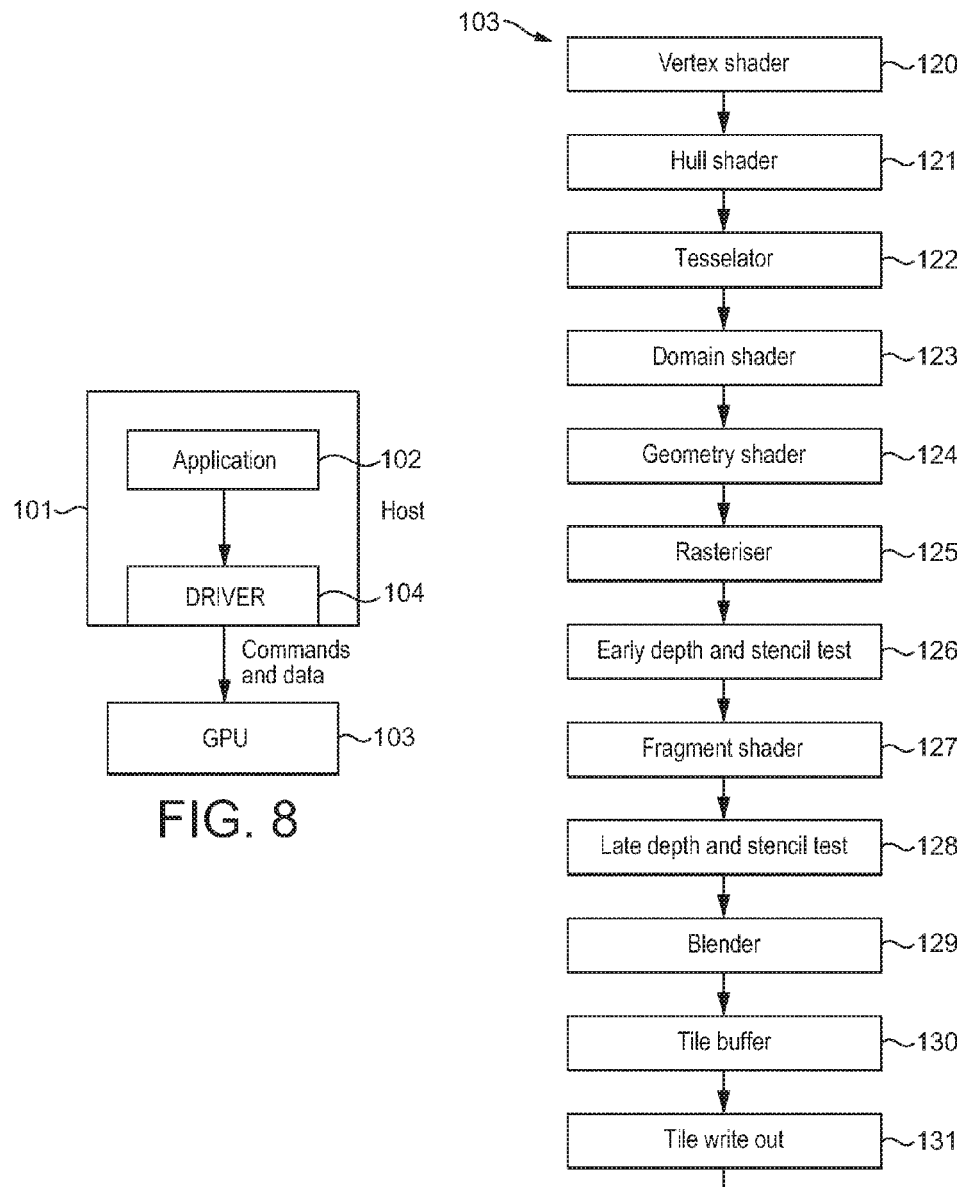

METHOD OF AND APPARATUS FOR GRAPHICS PROCESSING

BACKGROUND

The technology described herein relates to a method of and an apparatus for graphics processing, and in particular to a method of and an apparatus for "multiview", such as stereoscopic, rendering.

It is becoming increasingly common for graphics processing systems to be required to perform so-called "multiview" rendering. In this case, plural different views of a given scene are rendered, so as to create a set of images of the scene, e.g. with each image viewing the scene from a different viewpoint.

An example of this is stereoscopic rendering in which two images are rendered from different viewpoints. Typically, two images of a scene ("a stereo image pair"), one corresponding to the scene as seen from the left eye (a "left image"), and one corresponding to the scene as seen from the right eye (a "right image"), are generated and then displayed appropriately so as to provide a three-dimensional effect when the images are viewed. It is also known to generate and provide more than two views of a scene, for example for a lenticular display (which can, for example, use four or more images offset from each other).

It is also known to generate and provide a set of two or more images representing a given scene from the same viewpoint, but with e.g. a different field of view or scaling factor to the scene. This allows a graphics processor to, e.g., render parts of the scene from the same viewpoint at different resolutions.

When generating the multiple views required, typically the image corresponding to each respective view (be it a view from the same or a different viewpoint to another view of the set of images) is generated separately and then the images are displayed appropriately to achieve the desired, e.g., 3D, effect.

The Applicants believe that there remains scope for improvements to the generation of multiple images corresponding to multiple different views of the same scene when performing multiview, such as stereoscopic, rendering in graphics processing systems.

BRIEF DESCRIPTION OF THE DRAWINGS

Embodiments of the technology described herein will now be described by way of example only and with reference to the accompanying drawings, in which:

FIG. 8 shows an exemplary computer graphics processing system; and

FIG. 9 shows schematically a graphics processing pipeline that can be operated in the manner of the technology described herein;

Like reference numerals are used for like components where appropriate in the drawings.

DETAILED DESCRIPTION

Figure 1:
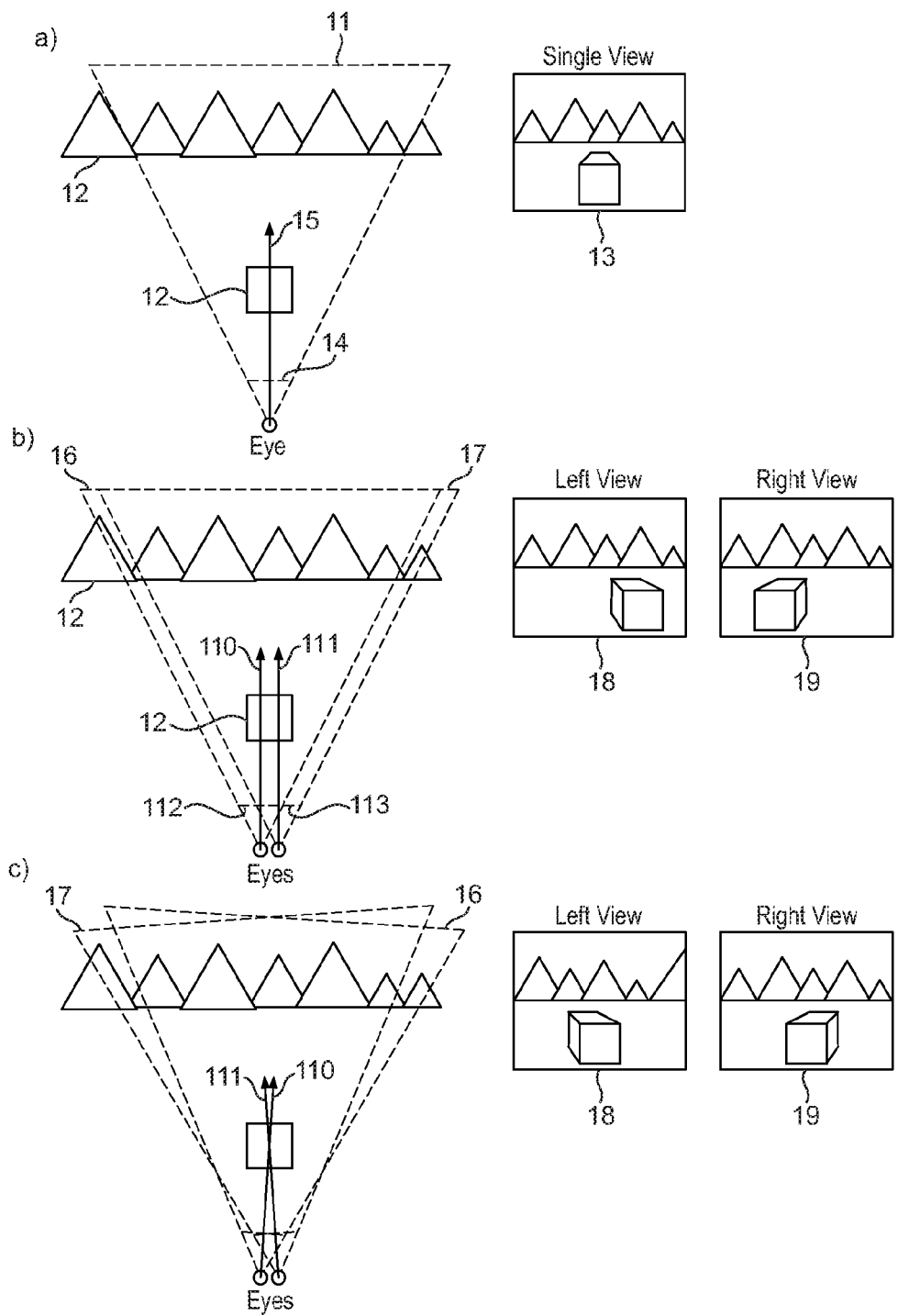
FIG. 1 illustrates the general principles behind stereoscopic images.

A first embodiment of the technology described herein comprises a method of operating a graphics processing system when rendering two or more images representing different views of the same scene, the method comprising:

determining a displacement between a first image and at least one other image of the two or more images; and controlling an aspect of the rendering of the two or more images based on the determined displacement.

A second embodiment of the technology described herein comprises a graphics processing system comprising:

a rendering stage configured to render two or more images representing different views of the same scene;

processing circuitry configured to determine a displacement between a first image and at least one other image of the two or more images; and processing circuitry configured to control an aspect of the rendering of the images based on the determined displacement.

The technology described herein relates to arrangements in which multiple views of the same scene are to be rendered. In particular, the technology described herein relates to arrangements wherein a graphics processing system is configured to render two or more images representing a scene (e.g. from different viewpoints) e.g. for the purpose of providing a three-dimensional display. In the technology described herein, a displacement between a first image and at least one other image of the two or more images is determined. The displacement is then used to control an aspect of the rendering of the images.

The Applicants have recognised that due to parallax between the two or more images that represent the same scene from different viewpoints, content of the scene that is to be represented will appear at different positions in the first image and each other image of the two or more images, e.g. once the content has been transformed from the world or user space that it is initially defined for to the screen space that the images are to be displayed in. This is particularly the case for, e.g., parts of the scene that will be in the foreground of the images, as these parts are likely to move position more significantly between the images.

The Applicants have also recognised that content of the scene that is to be represented may appear at different positions in the first image and each other image of the two or more images when the two or more images represent a scene from the same viewpoint but with, e.g., different fields of view.

The Applicants have further recognised that the displacement between the images representing the different view of the scene can be used to facilitate exploiting coherence between the two or more images during their rendering. For example, in the case of stereoscopic rendering, as will be discussed further below, knowledge of the displacement of parts of the scene between the first and second image of the stereo image pair can, for example, be used in a tile-based rendering system to determine which tile (be it in the left or right image) should advantageously be rendered next.

The scene that is to be displayed using the two or more images will be (and in embodiments is) a computer generated, three-dimensional model provided to (or generated by) the graphics processing system.

The two or more images can represent any suitable and desired number of views of the scene.

In one embodiment, the two or more images represent the scene from the same viewpoint. In such cases, the two or more images could represent the scene with different fields of view and/or resolutions.

In an embodiment, the two or more images represent the scene from different viewpoints. However, in some cases the set of two or more images could comprise at least one image representing the scene from the same viewpoint as another image, and at least one image representing the scene from a different viewpoint to another image of the set of two or more images.

In one embodiment, more than two images representing more than two different viewpoints of the scene are rendered, e.g. for the purpose of providing a lenticular display. For example, the graphics processing system could be configured to render four or more images representing the same scene from different viewpoints.

In an embodiment, only a pair of images representing the same scene from two different viewpoints are rendered, e.g. for the purpose of providing a stereoscopic display.

In the case of a stereoscopic display at least, each image should, and in an embodiment does, represent a view frustum representing the cone of vision that a human eye would have.

For a stereoscopic display, the first image of the stereo image pair should, and in an embodiment does, represent the scene from the viewpoint of one eye, e.g. the left eye, and the second image of the pair should, and in an embodiment does, represent the scene from the viewpoint of the other, e.g. right, eye. The images may accordingly be referred to as "left" and "right" images, respectively. In an embodiments the different viewpoints are separated by an appropriate distance (in three dimensional model space), e.g. an interocular distance, such that their view frustums replicate the field of view of the eyes of a human.

The displacement could be determined between the first image, and one, or more than one, other image, as desired (e.g., and in an embodiment, depending upon how many images are in the set of images that is being rendered to display the scene).

In one embodiment of the technology described herein, a displacement between the first image and only one other image is determined.

This will be the case, for example, where the two or more images comprise a single pair of images to be rendered for the purpose of providing a stereoscopic display.

Where there are more than two images in the set of two or more images that is being rendered to display the scene, then in an embodiment, a displacement is determined between a first image and more than one, and in an embodiment each, other image of the set of two or more images. For example, the graphics processing system may be configured to render four images and determine a displacement between: the first image and the second image; the first image and the third image; the first image and the fourth image. This is particularly applicable to the case of, e.g., lenticular displays, where each image represents the scene from a different viewpoint.

Correspondingly, where there are more than two images in the set of two or more images that is being rendered to display the scene, then a displacement may be, and is in an embodiment, determined for other combinations of the image in the set, such as between the second and third images, the second and fourth images, and the third and fourth images.

In an embodiment, regardless of whether or not only two images or more than two images of the scene are being rendered, the determined displacement is always with respect to a given pair of images of the two or more images.

Thus, in an embodiment a displacement is determined for respective pairs of images of the two or more images. For example, the two or more images to be rendered could be divided into one or more pairs of images, and a displacement between the images of a or each pair of images determined.

In the case of a stereoscopic display, the two or more images will comprise a single pair of images. However, where more than two images are to be rendered, e.g. for providing a lenticular display, the images can be divided into plural pairs of first and second images representing the scene from different viewpoints, with one or more, and in an embodiment each, such pair of images then being (respectively) processed to determine a displacement for the pair.

Thus in an embodiment, determining a displacement between a first image and at least one other image of the two or more images comprises determining a displacement between a first image and a second image of a pair of images (of the two or more images).

Where there are more than two images being rendered, then in an embodiment a displacement is determined between a first image and a second image of plural respective (different) pairs of images (of the two or more images).

In these arrangements, each pair of first and second images could comprise separate (different) images representing the scene, e.g. from different viewpoints (such that, in effect, each pair of a first and a second image(s) of the two or more images would be independent of all the other pairs of images of the two or more images).

However, where there are plural pairs of first and second images being processed, the respective pairs of images could (and in embodiments do) share images, such that at least one of the images in a given pair also belongs to a different pair of images to be processed. For example, the first image of a pair of images may also serve as the first image of a different pair of images to be processed. Equally, the second image of a pair of images may also serve as the first image of a different pair of images to be processed, and vice versa.

The displacement between the first image and another image of the two or more images being processed (between the pair of images) can be any suitable and desired measure of the displacement between the images.

As will be discussed further below, the displacement should represent the displacement between the images in the plane of the images, and so thus should, and in an embodiment does, represent a displacement in (x, y), where an x, y, z coordinate system is being used and z represents depth. Furthermore, as discussed below, in practice a displacement in the horizontal direction only may only be required, and so in an embodiment, the displacement represents a horizontal displacement between the first image and the other image of the two or more images.

In an embodiment, the displacement is a measure of the difference between the position of content of the scene to be processed (for the purpose of rendering the images) in the first image and in the other image. Thus, the displacement in an embodiment indicates, for content of the scene that is to be processed for rendering the images, the change in position (in screen space) of the content from the first image to the other image (and vice-versa).

The displacement can be in respect of any suitable or desired content of the scene to be processed for the purpose of rendering the images. Thus, the displacement can be in respect of one or more processing entities that are to be subjected to graphics processing operations for the purpose of rendering the images, such as, and in an embodiment, a primitive or primitives, a vertex or vertices, and/or a set of such entities.

Accordingly, the displacement can be (and in an embodiment is) a measure of the difference between the position that one or more primitives and/or vertices of the scene will have in the first image and the other image, e.g. after they have been transformed from the world or user space that they are initially defined for to the screen space that the first image and the other image is to be displayed in.

In one embodiment, a displacement is determined for a set of one or more processing entities of the scene that are associated with a given unit or units of processing, e.g. a draw call or draw calls, an object or objects, etc., to be rendered.

In an embodiment, a displacement is determined for a given, e.g. selected, e.g. defined, region or regions of the images (of one of the images of the two or more images). In this embodiment, the displacement will be with respect to content of the scene that is to be processed for rendering the region or regions in question. For example, a displacement representing the overall or average displacement of a set of one or more entities of the scene that are to be processed for and/or represented in a given, e.g. selected or desired, region or regions of the images could be determined.

The region of the images that is considered in these embodiments could correspond to the whole area of one of the images of the two or more images.

However, in an embodiment, the images are divided into plural, smaller regions (areas), and a displacement is determined for at least one, and in an embodiment for plural ones, of those smaller regions.

In this case, the regions for which a displacement is determined can be any suitable and desired regions of the images. They are in an embodiment regularly shaped regions, such as, and in an embodiment, rectangular regions (including squares). In an embodiment the (and each) region for which a displacement is determined corresponds to a processing tile that the graphics processing system operates on (and thus the graphics processing system is in an embodiment a tile-based graphics processing system). It would also be possible for the regions for which a displacement is determined to correspond to plural processing tiles or a sub-region of a processing tile, if desired.

It would be possible to determine only a single displacement measure for a given pair of images of the two or more images (e.g. representing the overall or average displacement from the first image to the second image (or vice-versa)). In one embodiment, this is what is done. However, in an embodiment, it is possible to determine plural displacement measures for the pair of images (and this is in an embodiment done). For example, a displacement can be (and is in an embodiment) determined for plural respective processing entities of the scene, and/or for plural regions of the images (such as for respective processing tiles that the images are divided into for processing purposes).

In an embodiment a displacement is determined for plural, e.g. selected or desired, regions, of the images (of one of the images of the pair). In this case, there will be plural displacement measures determined for the pair of images, with each displacement indicating the displacement of content of the scene to be processed for one of the regions of the images (e.g. the change in position of the (processing) content of an image region in the first image to the second image (and vice-versa)).

Of course, where more than two images comprising plural pairs of images are to be processed, a given region of the images (of one of the images) could have plural displacement measures determined for that region, with each displacement measure indicating the displacement of content of the scene to be processed for that region with respect to another one of the images (e.g. the change in position of the (processing) content of an image region in one image to one of the other images).

Where plural displacement measures are determined for a pair of images, then it would be possible to determine and store a displacement measure for each respective element or region that the images have been divided into (or for which displacement measures are determined), or, alternatively, the displacement measures could be encoded in some way, for example by only storing a displacement measure when the displacement measure changes.

The displacement for the processing entity, image region, etc., that is being considered can be determined in any suitable and desired manner (and this may depend, for example, on what the displacement is being determined for).

For example, where the displacement is being determined for a particular processing entity, such as a primitive, or vertex, of the scene, then the displacement (e.g. the change in position between the first and second images of a pair of images being considered) of the primitive or vertex in question could be directly determined.

On the other hand, where the displacement is in relation to a region of (one of) the images that may include one or more individual (processing) entities, then in an embodiment the displacement for the region, etc. is determined based on (e.g. the displacement of) respective processing entities of the image that make up (and are processed by the graphics processing system when rendering) the region of the image in question.

Thus, for example, where the displacement is in relation to a region, such as a processing tile, of (one of) the images, in an embodiment the displacement for the region in question is determined based on (and by considering) the displacement (the change in position) of respective processing entities, such as primitives and/or vertices, that fall within the image region (area) in question. In this case, the displacement of a single processing entity, such as a primitive or vertex, that falls within the region in question could be used as the displacement for the image region in question, but in an embodiment plural processing entities (e.g. plural vertices), falling within the image region in question are considered, and then the displacement for the image region in question is based on the displacements of plural of the processing entities (e.g. and in an embodiment all of the processing entities) that fall within (that are to be processed for) the image region.

In these arrangements, the displacement for an image region may be, and is in an embodiment, based on the average or sum of the distance and/or displacement that the one or more processing entities to be processed for the image region move between the first image and the second image of the pair of images being considered.

In embodiments, a weight function is used when determining the displacement for the image region in question, such that the displacement of some processing entities of the scene have more influence on the determined displacement for the image region. For example, it may be desirable to give a higher weighting (i.e. more influence) to processing entities that will be in the foreground of a pair of images (e.g. based on the depth of the processing entity in the scene (from the position of the viewpoint for the scene)).

The displacement for a processing entity that is to be used to determine a displacement for a region of a pair of images (or otherwise) can be determined in any suitable and desired manner.

In this regard, the Applicants have recognised that the displacement of an entity (to be processed) between the first image and the second image of the pair will depend upon the position of the entity in the scene (in the world space that the scene is initially defined for) relative to the position of the viewpoint of the first image and of the second image of the pair.

Thus, in an embodiment, the displacement between the first image and the at least one other image is determined based on the position of one or more processing entities in the scene (in the world space that the scene is initially defined for).

Furthermore, the Applicants have further recognised that in fact the only positional information that is required in order to determine a displacement measure is the depth of the processing entity in the scene (depth information), i.e. the distance (in world space) between the processing entity and the closest point on a plane in which both viewpoints of the pair of images being considered lie (wherein the normal of the plane is in the same direction as the normal of the image plane).

In particular, the depth of a processing entity can be used together with information pertaining to the image planes and viewpoints of the pair of images to determine a displacement for the element, e.g., using geometric methods, such as triangulation.

Thus, in an embodiment, the displacement of a processing entity and/or image region is determined using a depth measure for the entity or region.

This depth information is in an embodiment then used together with information pertaining to the image planes and viewpoints of the pair of images being considered to determine the displacement.

In these arrangements, the information pertaining to the image planes and viewpoints of the pair of images can be any suitable or desired information that can be used to determine the displacement. In embodiments, it comprises one or more or all of the following: the distance separating the viewpoint of the first image and the viewpoint of the second image; an angle between the line of sight of the entity or region in one of the images (e.g. the first image) (when viewed from the viewpoint of that image) and the normal of the plane in which the viewpoints lie; an angle of inclination of the view frustum of the first image and the second image; the field of view of the first image and the second image; and the scaling between the scene and the image plane of the first and second image.

In these arrangements, when determining a displacement for a region of the images, the depth of a single processing entity, such as a primitive or vertex, that falls within the region in question could be used to determine the depth measure for the region in question, but in an embodiment plural processing entities (e.g. plural vertices), falling within the region in question are considered. The depth measure for the region in question could then be based on the depths of plural of the processing entities (e.g., of all of the entities) that fall within the region, for example by using an average depth measure for the region, representing the average depth of the processing entities in the region.

However, in an embodiment, a minimum (and in an embodiment the minimum) depth value for the image region in question is determined and then used when determining the displacement for the region. Thus, in an embodiment, for each region of one of the images that are being considered, a minimum depth value is determined, and then used to determine a displacement for the region in question.

The displacement for a processing entity, image region, etc., can be determined by any suitable and desired stage or element of the graphics processing pipeline and at any suitable and desired time in the graphics processing operation. For example, this could be done by execution of an appropriate shader program (for example in the vertex shader), or a fixed function hardware unit could be provided to determine the displacement.

The displacement values could be determined in advance of rendering, and, for example, stored appropriately as metadata associated with each image region (e.g. processing tile) for example. In this case, the displacements could be determined, for example, as part of the tiling process (by the tiler). In this case, the tiler in an embodiment keeps track of the minimum depth value for a tile as it "adds" primitives, etc., to the tile, so that the correct minimum depth value is available to determine the displacement once the tiling has been completed. The minimum depth values could be stored hierarchically (thus for groups of plural tiles as well as for individual tiles), if desired.

Alternatively, the displacements could be calculated as relevant, e.g. image regions (processing tiles) fall to be rendered (e.g. as each tile is to be processed). In this case, a displacement could be determined for image regions (processing tiles) at intervals, rather than being done for each image region (processing tile) that is to be rendered.

In this case, the rasteriser may, e.g., make the relevant depth values available for use to determine the displacement for the tile that is being rendered.

The determined displacement can be represented in any desired and suitable form. The displacement may be an absolute measure (value) or it may be a relative value (a relative displacement), as desired. In an embodiment a relative displacement is determined.

For example, the displacement could indicate the distance in a given direction from the position of the content in question in a first image of the pair of images in question, to the position of that content in the other (second) image of the pair of images. Thus, the displacement may be in the form of a vector, e.g. indicating an offset from the position (in screen space) of content in a first image of the pair of images, to the position (in screen space) of that content in the second image of the pair of images.

In most cases the viewpoints of the first image and the second image will be separated by a horizontal offset only, so according to embodiments of the technology described herein, the displacement indicates a horizontal offset between (e.g. the processing entity or region in question in) one image (e.g. the first image) and the other (e.g. second) image of the pair of images in question.

Accordingly, the displacement data can be (and in embodiments is) in the form of a numerical value indicating a horizontal offset between the position of, e.g., the relevant entity and/or region in the first image and in the second image of the pair of images (e.g. the horizontal offset of the contents of the scene from its apparent position in one image to its apparent position in the other image of the pair of images).

In such cases, the sign of the numerical value can be (and in embodiments is) used to denote the horizontal direction of the displacement. For example, the numerical value may be positive for displacement to the right and negative for displacement to the left.

The displacement measure can indicate the displacement in any suitable or desired units of distance. However, in embodiments the displacement measure indicates the displacement in terms of units of screen space, such as the number of pixels (e.g. to the left or right) between the position of the content in question in the first image and in the second image (of the pair of images being considered).

Where a displacement measure is being determined for respective regions of the images, then in an embodiment, the displacement measure indicates by how many of the image regions the content has moved between the pair of images. Thus, in this case, the displacement would indicate, e.g., and in an embodiment, by how many of the image regions the content has moved to the left or the right when comparing the position of that content in the first and second images. in an embodiment, it is determined to which image region in the other image, the content of a given region in the first image has moved, and then the displacement measure indicates the difference in position between those two image regions, in an embodiment in terms of how many image regions the content has been displaced by.

Thus, in an embodiment, the first image and the second image of an image pair of the two or more images are correspondingly divided into plural regions (and in an embodiment processing tiles) in (screen space), and the displacement measure for a given region of one of the images indicates by how many regions the content of that region has moved in the second image (i.e. can be used to determine which region in the second image of the pair contains the content of that region in the first image).

Thus, in an embodiment, the displacement measure indicates (and can be used to determine) which region of the second image contains the content for the region that the displacement measure relates to. in an embodiment this measure is given as a relative value, indicating by how many image regions the content has been displaced (rather than, e.g., indicating the absolute position of the image region that the content has moved to).

For example, where the graphics processing system is a tile-based graphics processing system and the images are accordingly divided into plural regions, each corresponding to a processing tile that the graphics processing system operates on, then in an embodiment the displacement indicates by how many processing tiles the content of a given processing tile in one of the images has moved in the other image.

For example, if the content of the given tile in the first image has moved one tile to the right in the second image (of a pair of images of the two or more images), then the displacement measure for that tile in the first image could be indicated as being "+1", to indicate that the content of that tile now appears in the tile that is one tile to the right in the second image.

In these arrangements, where, as may be the case, the content of one image region does not move exactly to and completely fall within a given image region in the second image, then in an embodiment the image region in the second image that the displacement measure is used to indicate is selected based on, e.g., which image region in the second image the majority of the content in the first image region falls, or based on which image region in the second image the average displacement of the content falls, or in any other suitable and desired manner.

Thus, in an embodiment, the displacement for a region (e.g. processing tile) of one of the images is an integer value indicating the region (e.g. processing tile) that closely corresponds (in terms of its content to be processed) to that image region in the other image of a pair, in an embodiment in terms of an offset in terms of the number of image regions from the position of the image region in the first image.

The determined displacement between the first image and another image of the two or more images (between a pair of images) can be used to control an aspect of the rendering of the images in any desired and suitable manner, and, correspondingly, can be used to control any desired and suitable aspect (or aspects) of the rendering.

In an embodiment, the determined displacement(s) is used to influence, and in an embodiment to select, the order in which content of the scene is processed for the purpose of rendering the images. In an embodiment, the displacement(s) is used to influence, and in an embodiment to select the order in which regions (and in an embodiment processing tiles) of the images are rendered.

Thus, in an embodiment of the technology described herein, controlling an aspect of the rendering of the two or more images based on the determined displacement comprises controlling the order in which regions of the two or more images are rendered based on the displacement.

In an embodiment, the displacement is used to determine which image of the two or more images, and, in an embodiment, which element or region (e.g. processing tile) of that image, to render (at least in part) next.

In an embodiment the rendering of the two or more images is interleaved, based on the determined displacement(s). In an embodiment, the displacement(s) between the first image and another image of the two or more images is used to identify elements and/or regions, and in an embodiment regions, of the two or more images for which some or all of the same content will be processed when rendering the images.

This then facilitates exploiting coherence between the images, e.g., and in an embodiment by rendering corresponding elements or regions of the two or more images successively (where it is possible to do that). This can then allow re-use of at least some of the data generated for an element or region of a first image when rendering the corresponding element or region of the another image of the two or more images, thereby reducing the processing burden.

Rendering of the two or more images based on the displacement will now be described further with respect to the rendering of individual pairs of images for which a displacement measure has been determined. However, it will be appreciated that the "image pair" referred to here may be a single pair of images to be rendered (e.g. for providing a stereoscopic display) or one of plural pairs of images to be rendered (e.g. for providing a lenticular display).

Where a displacement measure has been determined for one or more (and in an embodiment all) of the regions of a first image of a pair of images, the displacement for each region could be used to identify a corresponding region of the other, second image to be rendered after the region of the first image (in order to exploit any coherence between the regions in question).

Thus where the graphics processing system renders the images by rendering respective regions of each image in turn, in an embodiment, once one region of one of the images has been rendered, a displacement measure for that region is used to identify a region in the other, second image of the image pair to be rendered next. This is in an embodiment then repeated for each region in the sequence of regions that is to be rendered for each of the images in turn. This process could, e.g., take the first region of the first image and then render the determined corresponding region of the second image and then revert to the next region of the first image and then the region of the second image that corresponds to that next region of the first image, and so on, or the process could, e.g., after rendering a region of the second image, then render the next region in the second image and then revert back to the corresponding region of the first image, and so on.

In an embodiment, the graphics processing system is arranged to render, and renders, each image of the image pair by rendering respective regions (e.g. and in an embodiment processing tiles) of the image in turn. In this case, there is in an embodiment a, in an embodiment selected, in an embodiment defined, order that the regions of a given image of the pair of images will be rendered in, such as raster or Morton order, which rendering order is followed when rendering the image in question, but the image of the pair to be rendered at any given time is selected in dependence upon the displacement determined for a respective region or regions of (one of) the images.

Thus, in an embodiment, the first image and the second image are identically divided into a plurality of regions, e.g. processing tiles, such that a given region in the first image has an equivalent region at the same position in screen space in the second image for the rendering process, and the regions of each image are then rendered in a particular (and the same) rendering order (with respect to the image in question). In an embodiment each region in the first image and the second image is associated with an index value indicating the position of the region within the rendering order for the image in question. Regions that are at the same position in the first image and the second image are thus in an embodiment associated with the same index value.

The plurality of regions may be indexed and considered for the entire image or for respective sub-regions thereof, such as for rows of regions (e.g. tiles) in the images. In this regard, the graphics processing system could process the regions on a row by row basis, or parts thereof, wherein each region in the row (or part thereof) is associated with an index value indicating its position along the row (or part thereof). The graphics processing system may also be configured to parallelise processing by dividing the task of rendering the rows between multiple processors, e.g. on a row by row basis.

The rendering process is then in an embodiment configured to render each region of the plurality of regions for a given image in turn (with respect to the rendering of that image) according to their position (index value) in the rendering order. For example, the first, second and third region etc. to be rendered for each image will be the regions having the index value 0, 1, and 2 etc., respectively.

This will then straightforwardly ensure that each region (e.g. tile) of the first image and the second image will (eventually) be rendered.

To facilitate this, a record, such as and in an embodiment, an index value, is in an embodiment maintained for each image (or image row) of the pair of images, indicating the position in the rendering order of the region of that image (or image row) to be processed (rendered) next. Thus, the image pair will in an embodiment have associated with it a first "next" processing region position (index value) indicating the next region to be processed in the first image and a second "next" processing region position (index value) indicating the next region to be processed in the second image. This record is in an embodiment appropriately incremented whenever a region is rendered so that the current position in the region rendering sequence (order) is tracked for each image as the pair of images are rendered.

Some or all of the regions, and in an embodiment each region, in one of the images of the pair (e.g. the first image) in an embodiment also has associated with it a displacement measure that indicates the position (index) in the rendering order of the "target" region in the other (second) image of the pair that has been determined to be where the content of the region of the first image has moved to in the second image of the pair. In embodiments, this displacement indicates the position (index) in the rendering order of the target region in the second image as the difference between the position (index) of the target region in the second image and the position (index) in the rendering order of the region in the first image to which it relates.

Thus, the position (index) in the rendering order of the "target" region in the other (second) image of the pair for a given region of the first image is in an embodiment determined by adding the displacement associated with (stored for) the region in the first image to the position (index) in the rendering order of the region in the first image.

The rendering process in an embodiment then starts at the first region in the rendering order for the first image of the pair of images (i.e. at the first region, having an index value "0", of the first image), and determines the corresponding "target" region in the second image based on the displacement for the first image region in question.

The position (index) of the target region in the second image is in an embodiment then compared to the position (index value) for the next region that is due to be rendered for the second image. If the position (index) of the target image region in the second image in the rendering order is greater than the position (index value) for the next region that is due to be rendered for the second image, then the next image region from the second image is rendered.

On the other hand, if the position (index) in the rendering order for the "target" image region of the second image is less than or equal to the position (index) in the rendering order of the next region to be rendered for the second image, then the image region from the first image is rendered.

Thus, in an embodiment, the sum of the position (index) for the next region to be rendered in the first image and the indicated relative image region offset is compared to the position (index) of the next region to be rendered in the other image of the image pair, and it is then determined whether to render a region from the first image or from the second image of the image pair based on that comparison (with the next region in the rendering order for the selected image then being rendered).

The relevant next region position (index) for the image in question is then incremented by one, and the process in an embodiment then repeated for the next region to be rendered in the first image of the pair, and so on, considering each region of the first image in turn, until all the image regions have been rendered.

This operation has the effect that where there is no displacement between regions of the images, then the rendering of regions of the first and second images will be interleaved one by one, but where the corresponding "target"

region in the second image of a given region in the first image is "ahead" in the rendering order of the current next region to be rendered in the second image, then a succession of regions in the second image will be rendered in turn (without rendering any regions of the first image) until the rendering of the second image has reached the target region in the second image (i.e., has in effect, caught up with the rendering of the first image).

In other words, if it is determined that one or more regions in the second image require rendering before the target region in the second image is reached, each region of the second image up to (but in an embodiment not including) the target region will be rendered, before rendering the next region of the first image.

Correspondingly, if the target region in the second image is "behind" the current next region to be rendered in the rendering order for the second image, then a or successive regions in the first image will be rendered (without rendering any regions in the second image) until a region in the first image whose target region in the second image is greater than or equal to the current next image region to be rendered in the second image has been reached (i.e. until the rendering of the first image has, in effect, caught up with the rendering position in the second image).

This ensures that all the regions of both of the images will be rendered, whilst still exploiting coherence between respective regions in the images, and without, e.g., skipping the rendering of regions in the rendering order, or revisiting earlier regions in the rendering order.

In an embodiment once the final region in the rendering order has been rendered for one of the images (which may e.g., be the final region in a row, where the rendering is being performed on a row-by-row basis, or may be the final region for the whole image where the whole image is being considered), then further rendering of that image is stopped and any remaining regions to be rendered for the other image are rendered in succession. Thus where, for example, the rendering is being performed on a row-by-row basis, once all the regions in a row have been rendered for one of the images, any remaining regions in the corresponding row for the other image of the pair will be rendered until the row for that image has been completed. The process will then move on to the next row and start again at the beginning of the rendering order for that row for each image.

It will be appreciated that in these arrangements, there will be one image of each pair for which displacements are stored (which will be the "first" image), with the other image then being the "second" image. For the case of a stereo image pair, the first and second images may be either the left or the right image, as desired.

Other arrangements would, of course, be possible.

The rendering operation in an embodiment proceeds in this manner until all the regions of the first image and the second image have been rendered.

Although the technology described herein has been described above with particular reference to the processing of a single pair of images, as will be appreciated by those skilled in the art, the technology described herein can be, and is in an embodiment used for processing plural image pairs. For example, the technology described herein can be, and is in an embodiment used for processing plural image pairs that the set of two or more images representing the scene (e.g. from different viewpoints) has been divided into, and or for processing plural image pairs of a sequence of images (frames) to be displayed.

Where a set of more than two images is being rendered, then in one embodiment, rendering between all of the images of the set of plural images is interleaved, based on the determined displacement(s). In this case, the determined displacement is in an embodiment used to select which image of the plural images, and in an embodiment which region of that image, is to be rendered next.

This can be done in any number of ways, but in an embodiment it is done in a corresponding manner to that described above with respect to pairs of images.

For example, as described above, each image of the plural images can be (and in an embodiment is) identically divided into regions, wherein each region is associated with an index value indicating its position in the rendering order for the image to which the region belongs and each image of the plural images is rendered by rendering the respective regions (e.g. and in an embodiment processing tiles) of the image in turn.

Similarly, each image in an embodiment has associated with it a "next" processing region position (index value) indicating the next region to be processed in that image.

For example, where the plural images comprises four images (e.g. for the purpose of providing a lenticular display), the images could have respectively associated with them: a first "next" processing region position (index value) indicating the next region to be processed in the first image; a second "next" processing region position (index value) indicating the next region to be processed in the second image; a third "next" processing region position (index value) indicating the next region to be processed in the third image; and a fourth "next" processing region position (index value) indicating the next region to be processed in the fourth image.

Some or all of the regions, and in an embodiment each region, in the images in an embodiment also has associated with it a displacement measure that indicates the position (index) of a region in the rendering order of a "reference" image (e.g. the fourth image) of the plural images that has been determined to be where the content of the region of a given image has moved to in the reference image. In embodiments, this displacement indicates the position (index) in the rendering order of the region in the reference image as the difference between the position (index) of the region in the reference image and the position (index) in the rendering order of the region in the image to which it relates.

(For regions of the reference image itself (e.g. the fourth image), the determined displacement will be zero, as the reference image will effectively be comparing with itself.)

Each image then in an embodiment has an associated "target" region (tile) (index (value)) which indicates the region in the reference image that, in effect, corresponds to the "next" region to be processed for the image in question. The target region is in an embodiment determined by adding the displacement associated with (stored for) the "next" processing region for the image in question to the position (index) in the rendering order of the "next" processing region in the image.

The region of the plural images selected to be rendered next is in an embodiment then a region from whichever image has the lowest target region (tile) value at that moment in time. In an embodiment the "next" processing region of (i.e. the region to be processed next for) the image having the lowest target region (tile) value at that moment in time is rendered next.

The relevant next region position (index) for the selected image is in an embodiment then incremented by one, and the process is in an embodiment then repeated. For example, the rendering operation will again determine and select an image having the lowest target region (tile) value and render the next region to be rendered in that image, and so on, until all the regions of the plural images have been rendered.

Other arrangements would, of course, be possible.

The images (and correspondingly each respective, e.g., processing region (e.g. tile) of the images) can be rendered in any suitable and desired manner.

Thus, the rendering stage may be configured and provided as desired, for example in a single processor, or as separate processing cores in a multi-core system. It would be possible to distribute the render output (i.e. the regions of the images) between the processing cores of a multi-core system, e.g. on a row-by-row basis.

Whilst the technology described herein has been described above with respect to rendering two or more images, it will be appreciated that the technology described herein is particularly applicable and suited to arrangements in which a stereo image pair is rendered for the purpose of providing a stereoscopic display.

Thus, another embodiment of the technology described herein comprises a method of operating a graphics processing system when rendering a pair of images representing the same scene from two different viewpoints for the purposes of providing a stereoscopic display, the method comprising:

determining a displacement between a first image and a second image of the pair of images; and controlling an aspect of the rendering of the pair of images based on the determined displacement.

Another embodiment of the technology described herein comprises a graphics processing system comprising:

a rendering stage configured to render a pair of images representing the same scene from two different viewpoints for the purposes of providing a stereoscopic display;

processing circuitry configured to determine a displacement between a first image and a second image of the pair of images; and processing circuitry configured to control an aspect of the rendering of the pair of images based on the determined displacement.

It will be appreciated that these embodiments can (and in an embodiment do) include any one or more or all of the features of the technology described herein, as appropriate.

For example, the displacement between the images is in an embodiment determined in one of the manners discussed above.

Correspondingly, in an embodiment, a displacement is determined for plural regions of the images (such as for respective processing tiles that the images are divided into for processing purposes).

Similarly, the determined displacement(s) is in an embodiment used to influence, and in an embodiment to select, the order in which content of the scene is processed for the purpose of rendering the stereo pair, in an embodiment in one of the manners discussed above.

The technology described herein can be, and is in an embodiment, used for processing plural stereo image pairs, e.g. for processing plural stereo image pairs of a sequence of scenes (frames) to be displayed.

Thus the graphics processing system and pipeline should (and in an embodiment does) produce some useful output data, e.g. graphics processing output data for use in (subsequent) graphics processing operations etc. In an embodiment, the generated output data is used to provide a pair of images for display, e.g. is provided to a display for display.

The technology described herein can be used in and with any suitable and desired graphics processing system and pipeline.

The technology described herein is particularly suitable for use with tiled renderers (tile-based graphics processing systems). Thus, in an embodiment, the graphics processing pipeline is a tiled-based graphics processing pipeline.

The graphics processing pipeline may contain any suitable and desired processing stages that a graphics processing pipeline may contain such as a tiler, a rasteriser, an early depth (or an early depth and stencil) tester, a renderer, a late depth (or depth and stencil) tester, a blender, a tile buffer or buffers, a write-out unit, etc.

The graphics processing pipeline in an embodiment also comprises, and/or is in communication with, one or more memories and/or memory devices that store the data described herein, and/or that store software for performing the processes described herein. The graphics processing pipeline may also be in communication with the host microprocessor, and/or with a display for displaying images based on the data generated by the graphics processing pipeline.

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In some embodiments, the technology described herein is implemented in computer and/or micro-processor based system.

The various functions of the technology described herein can be carried out in any desired and suitable manner. For example, the functions of the technology described herein can be implemented in hardware or software, as desired. Thus, for example, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

The technology described herein is in an embodiment implemented in a portable device, such as, and in an embodiment, a mobile phone or tablet.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display.

FIG. 8 shows a typical computer graphics processing system.

An application 102, such as a game, executing on a host processor 101 will require graphics processing operations to be performed by an associated graphics pipeline that is implemented by means of a graphics processing unit (GPU) 103. To do this, the application will generate API (Application Programming Interface) calls that are interpreted by a driver 104 for the graphics process pipeline 103 that is running on the host processor 101 to generate appropriate commands to the graphics processor 103 to generate graphics output required by the application 102. To facilitate this, a set of "commands" will be provided to the graphics processor 103 in response to commands from the application 102 running on the host system 101 for graphics output (e.g. to generate a frame to be displayed).

FIG. 9 shows the graphics processing pipeline 103 in more detail.

The graphics processing pipeline 103 shown in FIG. 9 is a tile-based renderer and will thus produce tiles of a render output data array, such as an output frame to be generated.

(In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.)

The render output data array may typically be an output frame intended for display on a display device, such as a screen or printer.

(When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.)

FIG. 9 shows the main elements and pipeline stages of the graphics processing pipeline 9 that are relevant to the operation of the present embodiments. As will be appreciated by those skilled in the art there may be other elements of the graphics processing pipeline that are not illustrated in FIG. 9. It should also be noted here that FIG. 9 is only schematic, and that, for example, in practice the shown functional units and pipeline stages may share significant hardware circuits, even though they are shown schematically as separate stages in FIG. 9. It will also be appreciated that each of the stages, elements and units, etc., of the graphics processing pipeline as shown in FIG. 9 may be implemented as desired and will accordingly comprise, e.g., appropriate circuitry and/or processing logic, etc., for performing the necessary operation and functions.

As shown in FIG. 9, the graphics processing pipeline 103 includes a number of stages, including vertex shader 120, a hull shader 121, a tesselator 122, a domain shader 123, a geometry shader 124, a rasterisation stage 125, an early Z (depth) and stencil test stage 126, a renderer in the form of a fragment shading stage 127, a late Z (depth) and stencil test stage 128, a blending stage 129, a tile buffer 130 and a downsampling and writeout (multisample resolve) stage 131.

The vertex shader 120 takes the input data values associated with the vertices, etc., defined for the output to be generated, and processes those data values to generate a set of corresponding "vertex shaded" output data values for use by subsequent stages of the graphics processing pipeline 103. The vertex shading, for example, modifies the input data to take account of the effect of lighting in the image to be rendered.

The hull shader 121 performs operations on sets of patch control points and generates additional data known as patch constants, the tessellation stage 122 subdivides geometry to create higher-order representations of the hull, the domain shader 123 performs operations on vertices output by the tessellation stage (similar to a vertex shader), and the geometry shader 124 processes entire primitives such as a triangles, points or lines. These stages together with the vertex shader 121 effectively perform all the necessary fragment frontend operations, such as transformation and lighting operations, and primitive setup, to setup the primitives to be rendered, in response to commands and vertex data provided to the graphics processing pipeline 103.

The rasterisation stage 125 of the graphics processing pipeline 103 operates to rasterise the primitives making up the render output (e.g. the image to be displayed) into individual graphics fragments for processing. To do this, the rasteriser 125 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 126 performs a Z (depth) test on fragments it receives from the rasteriser 125, to see if any fragments can be discarded (culled) at this stage. To do this, it compares the depth values of (associated with) fragments issuing from the rasteriser 125 with the depth values of fragments that have already been rendered (these depth values are stored in a depth (Z) buffer that is part of the tile buffer 130) to determine whether the new fragments will be occluded by fragments that have already been rendered (or not). At the same time, an early stencil test is carried out.

Fragments that pass the fragment early Z and stencil test stage 126 are then sent to the fragment shading stage 127. The fragment shading stage 127 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 127 is in the form of a shader pipeline (a programmable fragment shader).

There is then a "late" fragment Z and stencil test stage 128, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 130 to determine whether the fragment data for the new fragments should replace the fragment data of the fragments that have already been rendered, by, as is known in the art, comparing the depth values of (associated with) fragments issuing from the fragment shading stage 127 with the depth values of fragments that have already been rendered (as stored in the depth buffer). This late fragment depth and stencil test stage 128 also carries out any necessary "late" alpha and/or stencil tests on the fragments.

The fragments that pass the late fragment test stage 128 are then subjected to, if required, any necessary blending operations with fragments already stored in the tile buffer 130 in the blender 129. Any other remaining operations necessary on the fragments, such as dither, etc. (not shown) are also carried out at this stage.

Finally, the (blended) output fragment data (values) are written to the tile buffer 130 from where they can, for example, be output to a frame buffer for display. The depth value for an output fragment is also written appropriately to a Z-buffer within the tile buffer 130. (The tile buffer stores colour and depth buffers that store an appropriate colour, etc., or Z-value, respectively, for each sampling point that the buffers represent (in essence for each sampling point of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 130 is input to a downsampling (multisample resolve) write out unit 131, and thence output (written back) to an external memory output buffer, such as a frame buffer of a display device (not shown). (The display device could comprise, e.g., a display comprising an array of pixels, such as a computer monitor or a printer.)

The downsampling and writeout unit 131 downsamples the fragment data stored in the tile buffer 130 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 103 would, of course, be possible. The technology described herein relates to the situation in which the graphics processing pipeline 103 of FIG. 9 is being used to render multiple views of the same scene e.g. for the purpose of providing a three-dimensional display.

An embodiment of the technology described herein in which the graphics processing pipeline 103 of FIG. 9 is used to render pairs of images to be used for a stereoscopic display will now be described.

In this embodiment, the rendering order of the tiles for each image of a pair of images that are to be used for a stereoscopic display is controlled and selected based on a measure of the displacement between the content of the tiles between each image of the pair of images. This then facilitates the re-use of data that has already been produced for a tile in one of the images when rendering a tile in the other image, thereby reducing the overall amount of processing that may be required to generate the pair of images.

FIG. 1 illustrates the general principles behind stereoscopic images.

FIG. 1a shows a single viewpoint and corresponding view frustum 11 (viewed from above), a computer generated scene 12, and an image 13 representing a single view of the scene 12, e.g., for display.

As can be seen from the Figure, the viewpoint corresponds to the viewpoint of an eye. The view frustum 11 defines the extent of the scene that is seen from the viewpoint. The direction of the frustum axis 15 extending outwardly from the viewpoint defines the viewing direction.

The scene 12 may be divided into a plurality of graphical entities, such as primitives, that are to be processed for the purpose of rasterising and rendering the image 13 e.g. for display. In particular, the content of the scene that falls within the field of view of the viewing frustum 11 will undergo a transformation operation from the three-dimensional model space in which it is initially defined to the surface of an image plane 14 (in the three-dimensional model) that maps directly with the plane of the displayed image.

FIG. 1b shows a pair of images representing the same scene 12 as FIG. 1a but from slightly different viewpoints so as to give a stereoscopic effect.

The first image 18 represents the scene 12 from the viewpoint of the left eye. The second image 19 of the pair represents the scene 12 from the viewpoint of the right eye. The images may accordingly be referred to as the left view image and right view image respectively.

As can be seen in the Figure, the viewpoints are positioned slightly apart from one another so as to provide a binocular effect. Each viewpoint has its respective viewing frustum and image plane. In particular, the left view has a view frustum 16 and image plane 112, whilst the right view has viewing frustum 17 and image plane 113. The frustum axis of the first image and the second image (axis 110 and 111, respectively) are parallel to one another and extend in the same direction.

As is shown in FIG. 1b, there is natural parallax between the left view image 18 and the right view image 19 such that elements (e.g. objects) of the left view image 18 and the right view image 19 will appear at slightly different positions in the left view image 18 and the right view image 19.

This is particularly true for objects in the foreground of the scene. For example, the cube in the foreground of the scene can be seen to move position significantly between the left and right views.

FIG. 1c shows a similar arrangement to that of FIG. 1b, except that in this example the axis 110 of the left image view frustum 16 and the axis 111 of the right image view frustum 17 are not parallel to one another but rather converge.

As is shown in FIG. 1c, there is also a parallax between the first image and the second image, except that on this occasion elements in the background of the scene can be seen to move position more significantly between the left view image 18 and the right view image 19.

In accordance with the embodiments of the technology described herein, the graphics processing system is configured to use information relating to the viewing frustums (such as the angle of inclination of the frustum axis) and image planes etc. to determine a displacement between the first image and the second image (left view image and right view image, respectively), the displacement being a measure of the difference between the position of content of the scene to be processed (for the purpose of rendering the pair of images) in the first image and in the second image that the content is to be displayed in. This will now be described further in relation to FIGS. 2 and 3.

Figure 2:
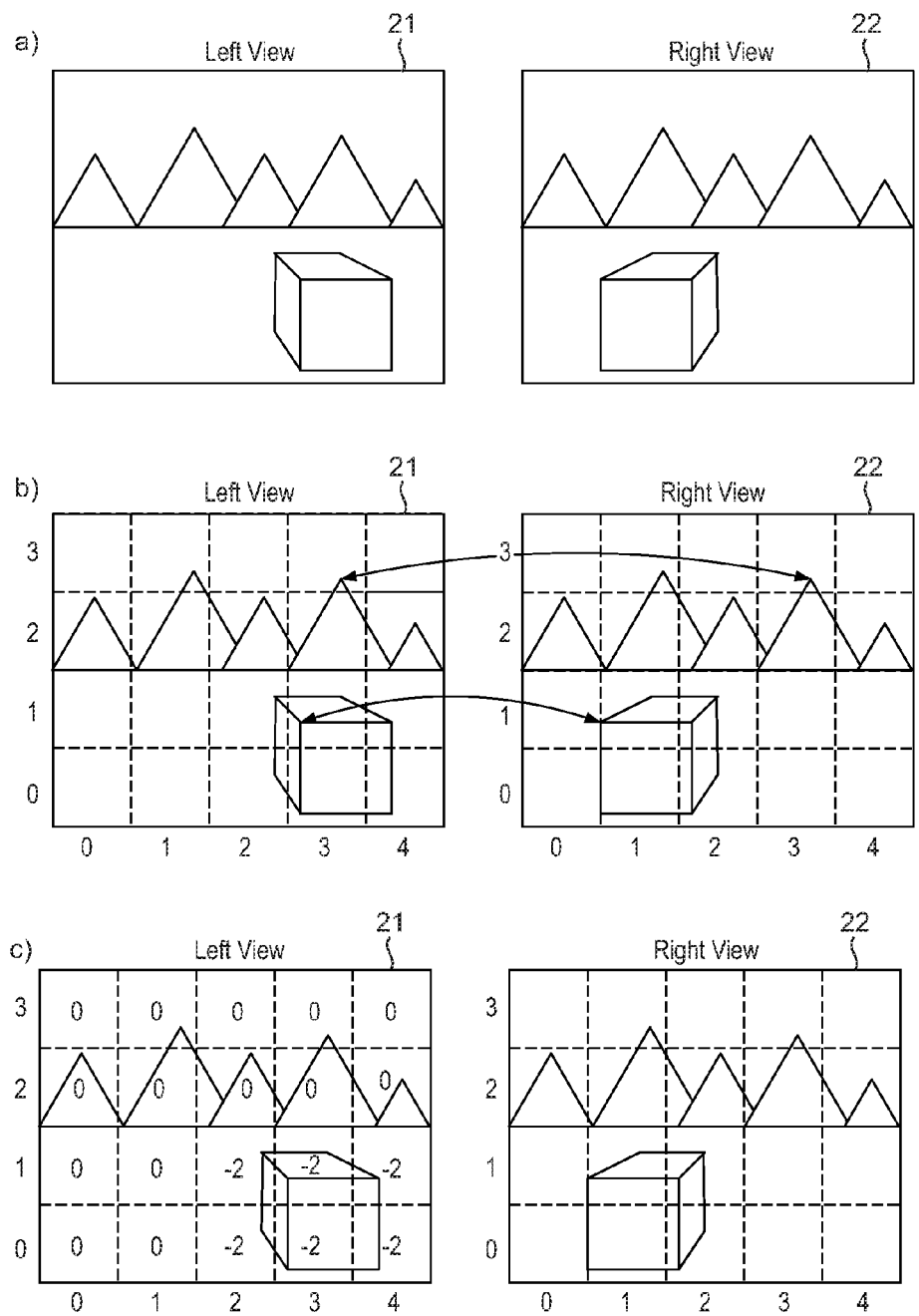
FIG. 2 illustrates schematically a stereo image pair, i.e. a pair of images, representing a scene from slightly different viewpoints, wherein the axis of the first image view frustum and the second image view frustum are parallel to one another and extend in the same direction.

FIG. 2 illustrates schematically a stereo image pair, i.e. a pair of images, 21, 22 representing a scene from slightly different viewpoints for the purpose of providing a stereoscopic display. The image pair may not be fully rendered images, but rather a raster image, showing the positions of objects in the scene in screen space, i.e. after they have been transformed from the world space that they are initially defined for to the screen space of the image.

FIG. 2a shows a pair of images (the stereo image pair) corresponding to the pair of images shown with respect to FIG. 1b. In this example, the viewpoint of the left view and the viewpoint of the right view are separated by a horizontal offset only and the frustum axes, are parallel.

It can be seen from the Figure that each image of the pair of images substantially corresponds to one another, except that objects in the images are located at slightly different horizontal positions in the two images. That is, there is a parallax observed for objects viewed along the two different lines of sight.

The difference between the position of objects in the left view image 21 and the right view image 22 is illustrated in FIG. 2b. In this example, the left view image 21 and the right view image 22 is the same as those illustrated in FIG. 2a, except that in this case each image has been divided into a plurality of processing tiles that the graphics processing system operates on.

Each tile in the left view image 21 and the right view image 22 is associated with a position within the image in question and is typically represented as a co-ordinate value (x, y) indicating the x and y position of the tile within the image. It can be seen from the Figure that the left view image 21 and the right view image 22 may be divided into a plurality of rows, wherein the tiles along each row have an index value (e.g. 0, 1, 2, 3 or 4) indicating the position of each tile along the row. It can be seen that tiles that are at the same position in the left view image 21 and the right view image 22 will be associated with the same co-ordinate value. For example, the tile at the bottom left of the left view image 21 and the right view image 22 has a co-ordinate value of "0, 0".

As is pointed to by the arrows in FIG. 2b, the position of a given object in the left view image 21 is displaced relative to the position of the same object in the right view image 22 (and vice versa). For example, a given object that falls within a tile of the left view image 21 will not necessarily fall within the same tile of the right view image 22. This is shown in FIG. 2b by the arrows indicating the displacements between the two images for specific objects in the images.

For example, the arrows in FIG. 2b show that the position of, e.g., a cube in the foreground of the images has moved position significantly between the left view image 21 and the right view image 22. A corner of the cube in the left view image 21 falls within tile "3, 1" of the left view image 21, but is displaced such that it falls within tile "1, 1" of the right view image 22. That is, the corner of the cube has moved two tiles to the left in the right view image 22, relative to its position in the left view image 21.

FIG. 2c illustrates an embodiment of the technology described herein wherein a displacement measure is determined for each tile in the left view image 21 of the pair of images. In this case, the displacement for each tile is a measure of the difference between the positions of the tile in question in the left view image 21 to its corresponding tile in the right view image 22. Thus, the displacement is in the form of an offset value indicating the index of the corresponding tile along the row in the right view image 22 relative to the index of the tile in question in the same row of the left view image 21.

In the present embodiment, the displacement for a tile in question is determined based on the depth of respective entities, such as primitives and/or vertices, that fall within the tile in question.

In particular, the minimum depth of the processing entities falling within the tile is determined and used together with information pertaining to the image planes and viewpoints of the pair of images to determine a displacement for the element, e.g., using geometric methods, such as triangulation.

The information pertaining to the image planes and viewpoints of the pair of images may comprise, for example, the distance separating the viewpoint of the first image and the viewpoint of the second image; an angle between the line of sight of the entity or region in one of the images (e.g. the first image) (when viewed from the viewpoint of that image) and the normal of the plane in which the viewpoints lie; and an angle of inclination of the view frustums of the first image and the second image.

Other arrangements would, of course, be possible.

As can be seen in FIG. 2c, some of the tiles in the left view image 21 have a displacement value of "−2", where the content of the tile has moved two tiles to the left between the left view image 21 and the right view image 22. However, it can be seen that an object in the background of the scene represented in the left view image and the right view image has not moved significantly between the left view image and the right view image. Therefore, the tiles representing those objects in the left view image are assigned a displacement value of "0".

Figure 3:
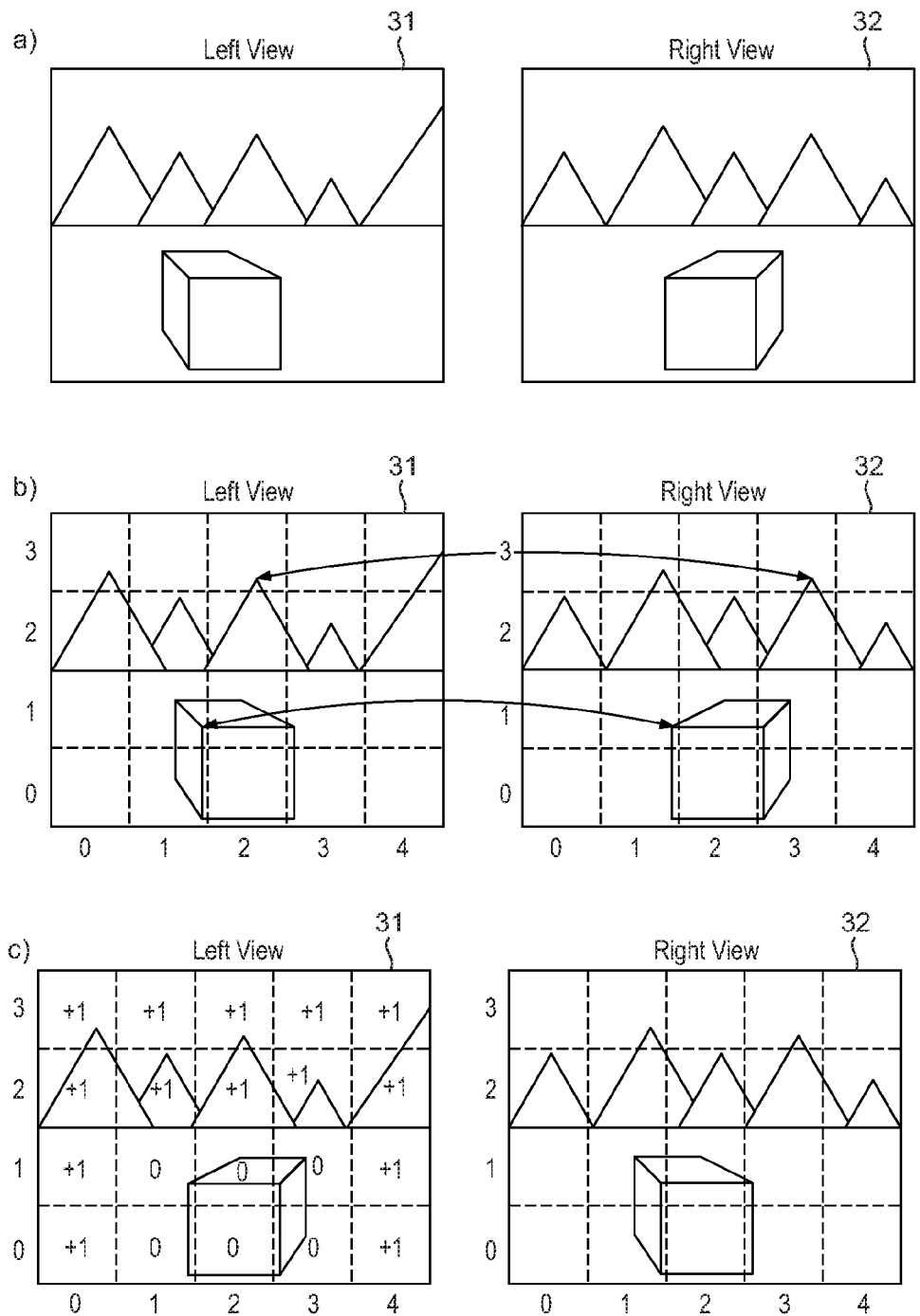
FIG. 3 illustrates schematically a stereo image pair, i.e. a pair of images, representing a scene from slightly different viewpoints, wherein the view frustum axis of the first image and the second image are not parallel but rather converge.

FIG. 3 is very similar to FIG. 2, except that FIG. 3 illustrates schematically the stereo image pair of FIG. 1c, wherein the frustum axis of the left view image and the right view image (axis 110 and 111, respectively) are not parallel but rather converge.

As was the case for FIG. 2, each image of the pair of images substantially corresponds to one another, except that objects in the images are displaced to slightly different horizontal positions between the two images (as is indicated by the arrows of FIG. 3b). However, in contrast to the arrangement of FIG. 2, elements in the background of the scene also move position more significantly between the left view image 31 and the right view image 32.

It will be appreciated that although the embodiments of FIGS. 1-3 have been described with respect to images representing the scene from different viewpoints, this is not required. For example, as mentioned above, the methods and embodiments described herein are equally applicable to arrangements where the two or more images represent the scene from the same viewpoint, and in such arrangements the content of the scene could still appear in different positions in the first image and the each other image, due to the images having different fields of view, for example.

Figure 4:
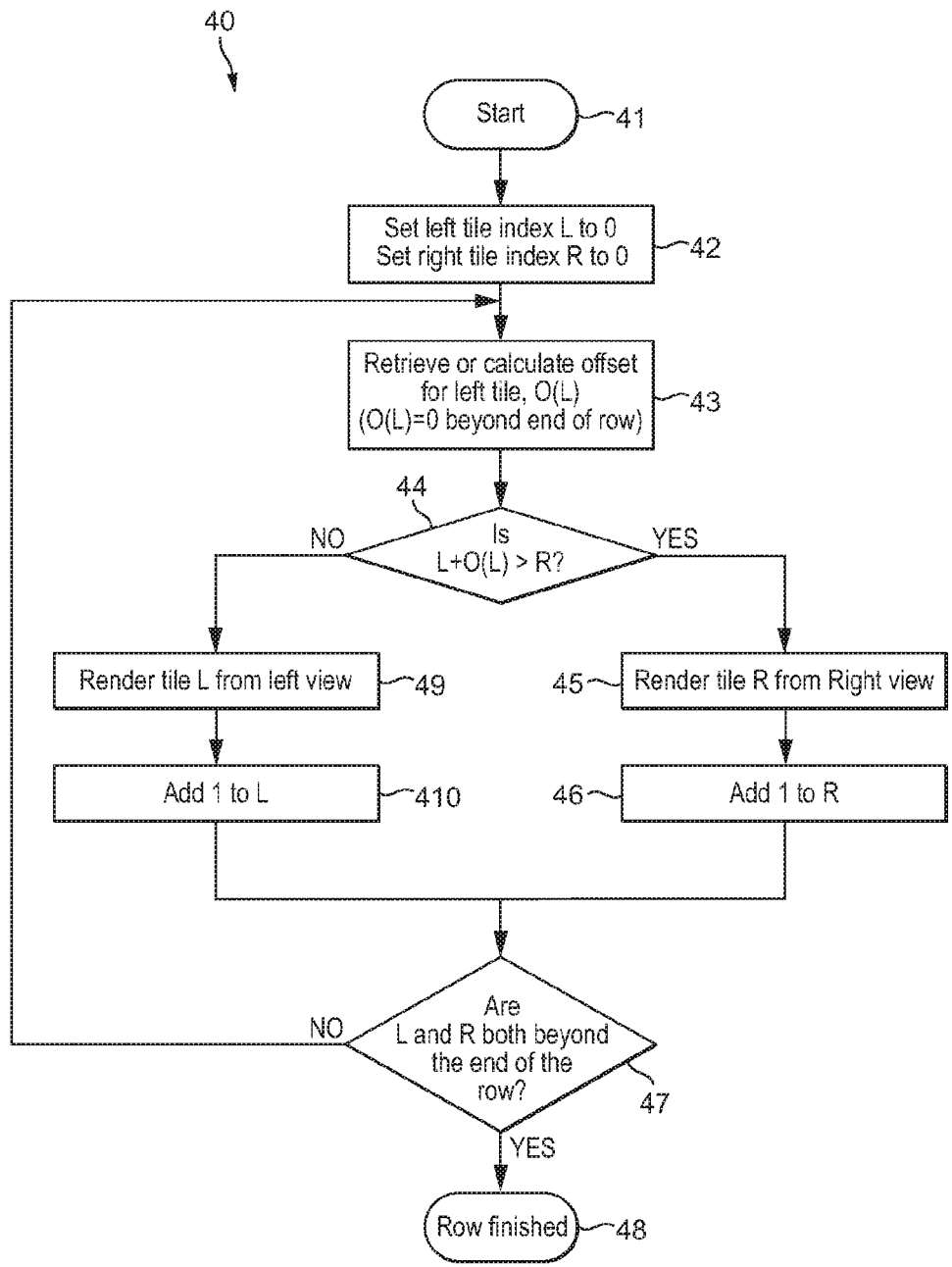
FIG. 4 is a block diagram illustrating schematically a method of rendering the first image and the second image an embodiment of the technology described herein.

FIG. 4 is a flow diagram illustrating schematically a method of rendering the first image and the second image according to an embodiment of the technology described herein, using the index values and displacements as illustrated in FIGS. 2 and 3.

In this embodiment, the rendering stage of the graphics processing system is configured to process the render output (i.e. the first image and the second image) in rows of tiles, wherein each row of a given image is processed separately to other rows of the same image.

The rendering stage is also configured to render the tiles of each row in turn, according to their index value. For example, the first, second and third tile etc. to be rendered for each row will be the tiles having the index value 0, 1, and 2 etc., respectively. Accordingly, each image, (and in particular, each row) of the pair of images has a next tile index value indicating which tile is to be rendered next for that image (row). In particular, the left image (or a given row of that image) will be associated with a left tile index, L, and the right image (or a given row of image) will be associated with a right tile index, R.

(It will be appreciated that although the first image and the second image are referred to here as a "left image" and a "right image", the first and second image do not necessarily represent a left and right view of the scene. As mentioned above, the first image and the second image could represent the scene from the same viewpoint, albeit with different fields of view, for example.)

Once the method of FIG. 4 has begun at step 41, the rendering stage is initialised at step 42 by setting the next tile index for the left image and the next tile index for the right image to "0".

According to the embodiment of FIG. 4, the rendering stage of the technology described herein is configured to iterate over each tile in the left (first) image (beginning at the first tile, having an index value "0", of the first image) and determine for the tile in question an offset value, O, between the index of the tile in question to the index of the corresponding tile in the right (second) image (step 43).

The offset value is determined based on the displacement value for the tile in question. As, in the embodiments shown in FIGS. 2 and 3 the displacement is already in the form of a tile offset value, the offset is determined by simply retrieving the displacement value for the tile from memory. (In other embodiments, e.g. where the displacement is in the form of raw distance data, the offset is determined by calculating the offset (in terms of the number of tiles) based on the distance data.)

If the displacement value for a tile in the left image points to a position in the right image that is beyond the end of the corresponding row in the right image, a default offset value, e.g., "0", is set for the tile.

At step 44 it is determined for the tile of the left image in question if the index of the corresponding tile in the right image (i.e. the target tile in the right image that should be rendered to exploit the coherence between the images) is greater than the index of the current next tile to be processed in the right image. This is done by comparing the value L+O with R.

If it is determined at step 44 that the index of the corresponding tile in the right image is greater than the index of the next tile to be processed in the right image (i.e. that L+O is greater than R), the rendering stage will proceed to step 45, at which point it will render the next tile of the right image (the tile having the index R). Once the tile R of the right image has been rendered, the rendering stage will add the value "1" to the index R at step 46, so that it is known to the system that the next tile to be rendered for the right image is the tile at one position to the right of the tile in the right image that was rendered at step 45.

However, if it is determined at step 44 that the index of the corresponding tile in the right image is not greater than the index of the next tile in the right image (i.e. that L+O is equal to or less than R), the rendering stage will proceed to step 49 and render the next tile of the left image in question, L. Once the tile L of the left image has been rendered, the rendering stage will add the value "1" to the index L at step 410, so that it is known to the system that the next tile to be rendered for the left image is the tile at one position to the right of the tile in the left image that was rendered at step 49.

The technology described herein will proceed in this manner for all of the tiles in the row. In particular, it is determined at step 47 whether or not the index values L and R indicate tiles that are both beyond the end of the row. If it is determined that they are not, then there are remaining tiles in the row(s) that need to be rendered and the rendering stage will accordingly loop back to step 43 and repeat the subsequent rendering steps described above. If it is determined at step 47 that the index values L and R are beyond the end of the row, then the entire row of the left image and the right image has been rendered and the process will end for the row (step 48).

In this way, if the target tile in the right image is at a higher index than the current next tile to be processed in the right image, successive tiles of the right image will be rendered so as to, in effect, "catch up" the rendering of the right image, before the next tile in the left image.

Correspondingly, if the target tile in the right image is at a lower index than the current next tile to be processed in the right image, successive tiles of the left image will be rendered so as to, in effect, "catch up" the rendering of the left image, before the next tile in the right image.

This facilitates more effective re-use of, e.g. cached, data for the left image when rendering the tiles of the right image (and vice-versa), whilst ensuring that none of the tiles in the images are omitted or skipped when rendering the images.

The process is then repeated for the next row of the images, and so on, until all the rows have been rendered.

Figure 5:
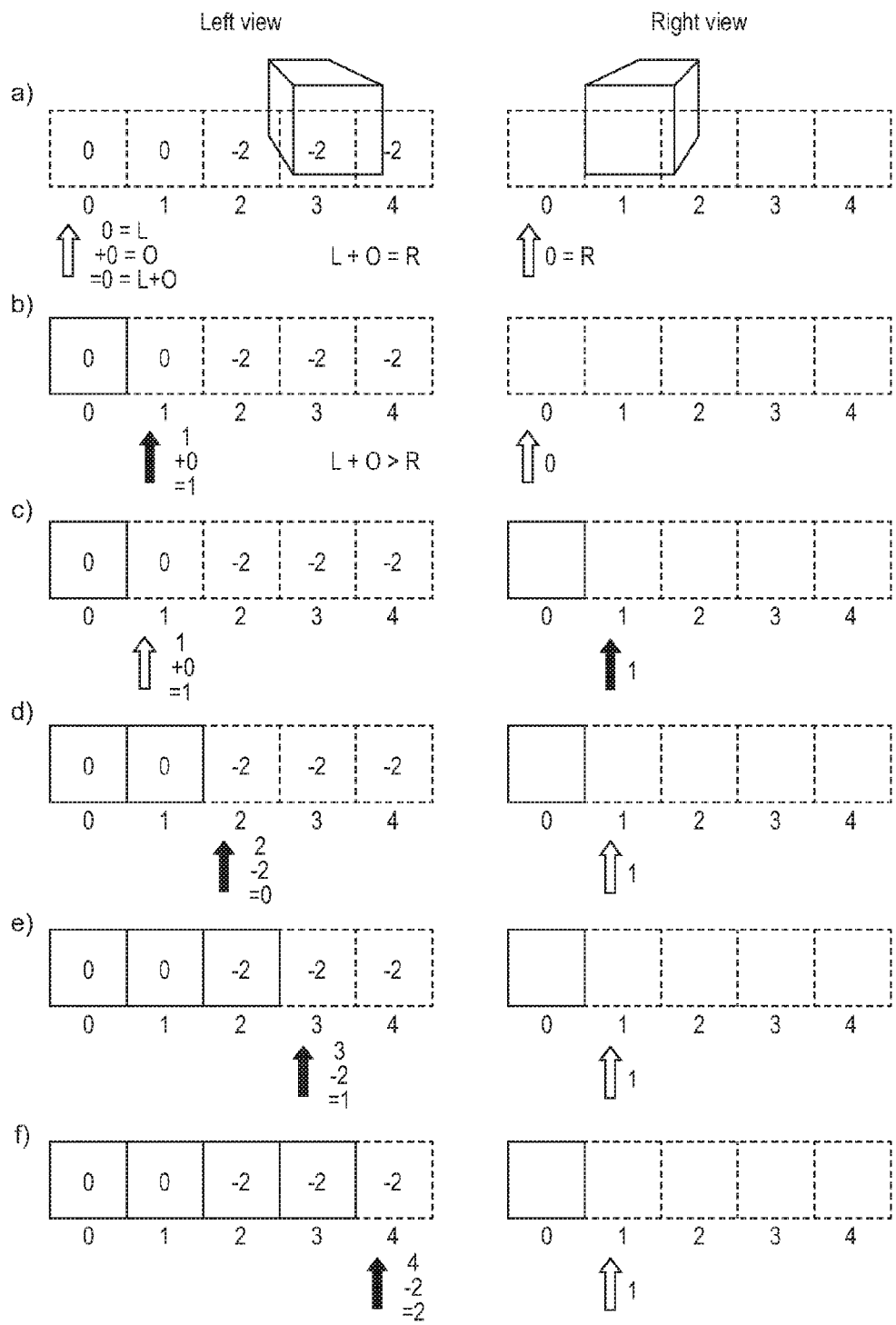
FIG. 5 illustrates schematically the method of the technology described herein, particularly the method of FIG. 4, applied to a single row of the first image and the same row of the second image of the pair of images.

FIG. 5 illustrates schematically the method of the technology described herein, particularly the method of FIG. 4, applied to a single row of the left image and the same row of the right image of the pair of images.

Again, the left image and the right image are divided into rows of tiles, wherein each row of a given image is processed separately to other rows of the same image. Each row comprises 5 tiles, wherein the first, second, third, fourth and fifth tile along the row has an index value of 0, 1, 2, 3 and 4, respectively. Although only one row is shown for each image, it will be appreciated that the left image and the right image may be divided into a plurality of rows that are to be subjected to the rendering method of FIG. 4.

Each tile of the row in the left image has a displacement value associated therewith. These displacement values are displayed in the centre of each tile. It can be seen that the first and second tiles of the row have a displacement value of "0", whilst the remaining tiles have a displacement value of "2". These values indicate the index of the corresponding tile in the right image relative to the index of the tile of the row in the left image to which the displacement relates.

As was the case for the embodiment shown in FIG. 4, the row of each image of the pair of images will have a next tile index value indicating which tile is to be rendered next for that row. In particular, the row of the left image is associated with a left tile index, L, and the row of the right image is associated with a right tile index, R. The tiles of the left image and the right image that are indicated by the next tile indices are pointed to by the arrows in FIG. 5.

The left tile index, L, and the right tile index, R, are initialised (by setting them to "0"), and the rendering stage is configured to begin at the first tile of the left image, that is the tile having an index value "0" in the left image.

In FIG. 5a, it is determined for the first tile of the left image if the index of the corresponding tile in the right image is greater than the index of the next tile in the right image. This is determined by comparing the value L+O with R.

In this case, as can be seen in FIG. 5a, both R and L+O are equal to zero, and so the rendering stage will proceed to render the first tile of the left image and add the value "1" to the index L (see steps 44, 49 and 410 of FIG. 2). The tile that has been rendered is shown in FIG. 5b, as the tile having a solid border.

Once the first tile of the left image has been rendered, it is then determined for the next tile of the left image (the second tile, tile "1") if the index of its corresponding tile in the second image is greater than the index of the next tile in the right image. This is determined in the same way as described above, by comparing the value L+O with R.

In the case of FIG. 5b, the index of the corresponding tile in the right image (L+O) is equal to 1, which is greater than the next tile index in the right image (which currently has a value of 0). Accordingly, the rendering stage will proceed to render the tile of the right image that is indicated by the right tile index, i.e. the first tile (tile "0") of the right image, and add the value "1" to the index R (see steps 44, 45 and 46 of FIG. 4).

The process then continues in this manner for the remaining tiles of the row in the left image, as can be seen from FIG. 5c to FIG. 5f.

Figure 6:
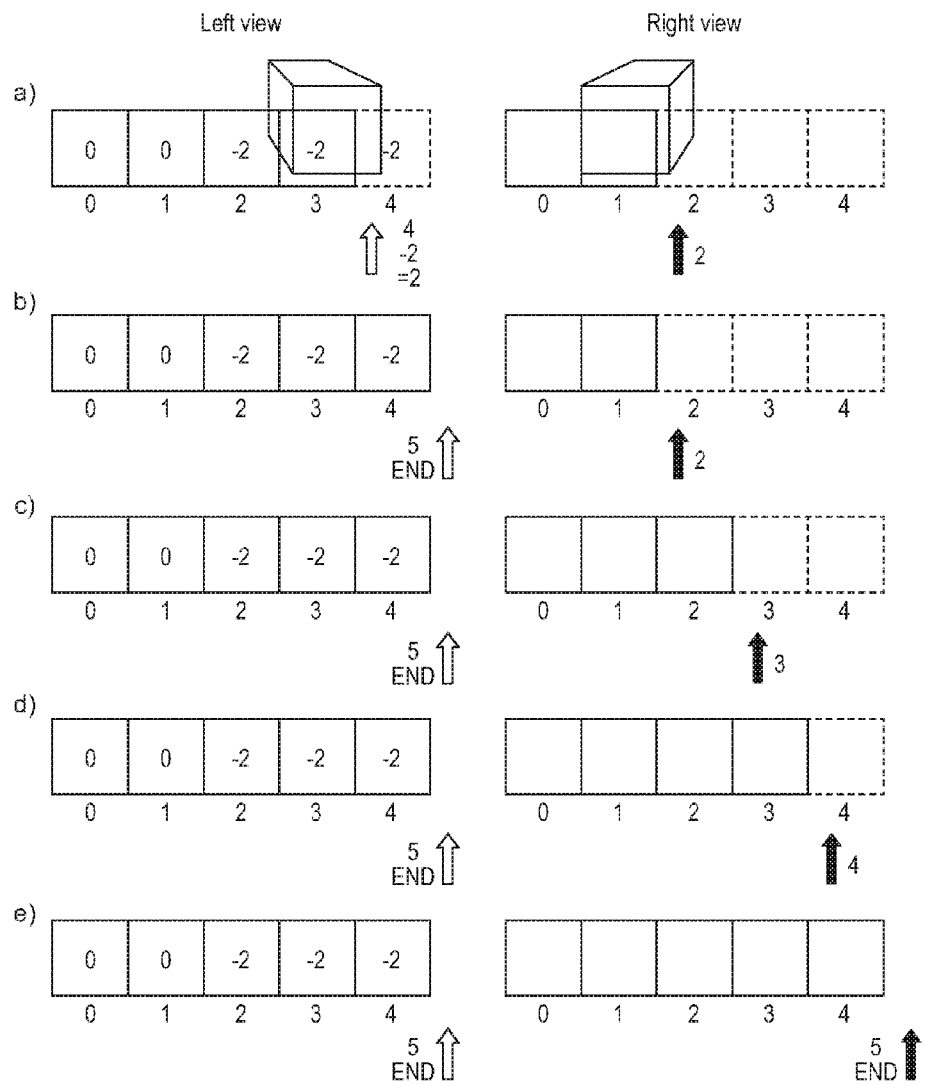
FIG. 6 illustrates a continuation of the method shown in FIG. 5, where the rendering stage has finished rendering one of the rows of the pair of images before the other.

FIG. 6 illustrates a continuation of the method shown in FIG. 5, where the rendering stage has finished rendering one of the rows of the pair of images before the other. In this case, it can be seen from FIGS. 6a and 6b that the final tile in the left image will be rendered before the third tile in the right image.

The left tile index will accordingly be set at a value of "5", indicating a tile that is beyond the end of the row. Equally, the offset value for such a tile (that is beyond the row) will be set at 0.

In doing so, the value L+O for that tile will always be greater than R, and so the rendering stage will render the next tile of the right image and successive tiles in the right image up to (but not including) the final tile of the right image (see steps 43-47 of FIG. 4).

For example, as can be seen in FIGS. 6b to 6e, the rendering stage will render each tile of the right image successively until the rendering of the right image has essentially caught up with the rendering of the left image.

Figure 7:
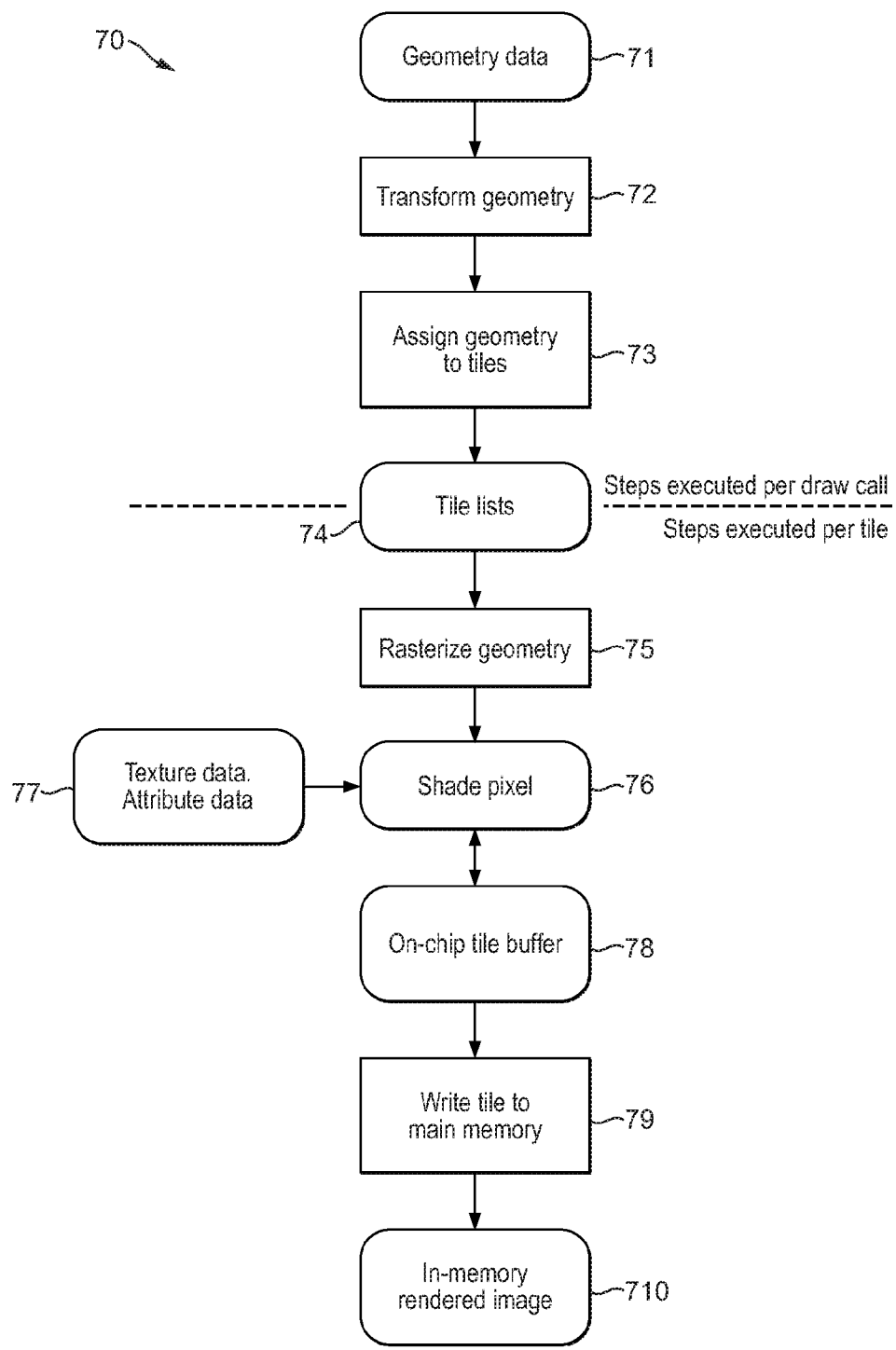
FIG. 7 is a flow diagram schematically illustrating the various stages of graphics processing an embodiment of the technology described herein.

FIG. 7 is a flow diagram schematically illustrating the various stages of graphics processing according to an embodiment of the technology described herein.

As shown in FIG. 7, the graphics processing 70 will begin with geometry data 71 for the scene to be rendered (for the purpose of stereoscopic display). For example, the scene may be divided into a plurality of individual entities such as primitives, each having its own positional data indicating its position in three-dimensional space.

When it is desired to render images representing the scene (e.g. from different viewpoints), the graphics processing system 70 will transform the geometry data at step 72 from the world space that it is initially defined for to the screen space of the first image and the second image.

(According to embodiments of the technology described herein, it would be possible to determine a displacement at the stage at which the geometry is transformed to screen space, as the graphics processing system will already operate to use position data for the entities of the scene for the purpose of determining their position in screen space of an image being rendered.)

At step 73, the transformed geometry, i.e. primitives, are passed to a tiler (tiling stage) of the graphics processing system, so that they can be assigned to tiles. For example, the tiler will identify which primitives should be processed for each tile that the render output has been divided into, and prepares a respective tile list (primitive list) 74 for each tile, indicating the primitives that should be processed for that tile.

In the present embodiment, the tiler also operates to determine a displacement for each tile based on, e.g., the displacement depth of each primitive that is listed in the tile list for the tile in question.

At stage 75, the primitives indicated in the tile list are subjected to appropriate frontend processing operations, such as primitive (triangle) setup and rasterisation to fragments.

The fragments generated by the rasteriser are then passed to an appropriate fragment (pixel) shading stage 76 for shading (rendering). For example, the shading stage 76 may be configured to receive texture data and attributes data and render the graphics fragments representing the primitives accordingly.

The rendered fragment data (sampling position data) is then written to an on-chip tile buffer 78 and, subsequently, written out as pixel data to main memory 79. Thus, the fully rendered stereo image pair is stored in memory 710, e.g. for display (not shown).

Although the above embodiment has been described with specific reference to the production of stereoscopic displays, the technology described herein is not limited to such arrangements. The technology described herein is applicable more generally to any kind of arrangement in which two or more images representing the same scene are rendered, e.g. for the purpose of providing a three-dimensional display.

Where the graphics processing system is configured to render more than two images of the scene, a displacement measure can be determined for respective pairs of images within the three or more images. For example, the three or more images to be rendered could be divided into one or more pairs of images, which pairs of images will then be processed in the manner discussed above, to determine a displacement measure (or measures) between the images of the pairs, and to thereby control the rendering order of the images.

Additionally, as described above, instead of rendering the images as respective pairs of images, it is possible to interleave rendering between all of the images of the plural images, based on the determined displacement. For example, instead of selecting which image (or region thereof) of a pair of images to render next based on the determined displacement, the technology described herein can (and in embodiments does) use the determined displacement to select which image of three or more images, and in an embodiment which region of that image, is to be rendered next. An embodiment of this will now be described with respect to FIG. 10.

Figure 10:
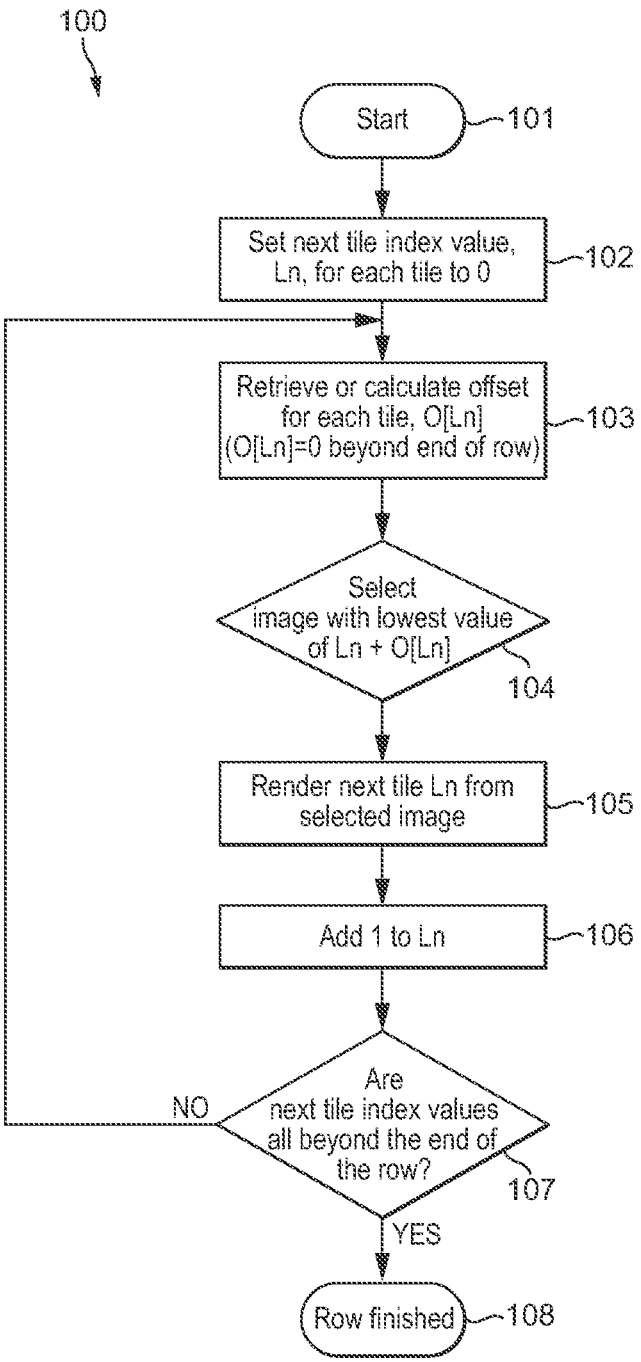
FIG. 10 is a block diagram illustrating schematically a method of rendering multiple images an embodiment of the technology described herein.

FIG. 10 is a flow diagram illustrating schematically a method of rendering a set of four images, each representing the scene from the same or a different viewpoint to another image of the set of four images, according to an embodiment of the technology described herein.

As was the case in the embodiment of FIG. 4, the rendering stage of the graphics processing system is configured to process the render output (i.e. the plural images) in rows of tiles, wherein each row of a given image is processed separately to other rows of the same image.

The rendering stage is also configured to render the tiles of each row in turn, according to their index value. For example, the first, second and third tile etc. to be rendered for each row will be the tiles having the index value 0, 1, and 2 etc., respectively. Accordingly, each image, n, of the set of plural images has a next tile index value, Ln, indicating which tile is to be rendered next for that image. For example, in this embodiment the first image (where n=1) will be associated with a first tile index, L1, the second image (where n=2) will be associated with a next tile index, L2, the third image (where n=3) will be associated with a next tile index, L3, and the fourth image (where n=4) will be associated with a next tile index, L4, Once the method of FIG. 10 has begun at step 101, the rendering stage is initialised at step 102 by setting the respective next tile index values L1, L2, L3 and L4 for the four images to "0".

Correspondingly to the embodiment described in FIG. 4, in this embodiment, the rendering stage of the technology described herein is configured to iterate over the next tile in each image (beginning at the first tile, having an index value "0", of each image) and determine for the tile in question an offset value, O, between the index of the tile in question and the index of the corresponding tile in the fourth image of the set of four images (step 103). (For the next tile in the fourth image, the offset value will be "0", given that it will essentially be comparing with itself.)

In this embodiment, for each image of the set of four images, an array of offsets On [ ] is previously determined for the tiles of that image.

The offset value for a given tile is then determined by looking up the offset value for the tile in question from the array of offset values in memory. (In other embodiments, e.g. where tile displacement is in the form of raw distance data, the offset may be determined by calculating the offset (in terms of the number of tiles) based on the distance data. This could then be done on a tile-by-tile basis.)

At step 104, a target tile value is determined for each image, n, by adding the offset value, O, associated with the next processing tile for the image, to the position index, Ln, of the next tile of that image. The image with the smallest target tile value in the fourth image (the reference image) is then selected to be rendered next.

After the image with the smallest target tile value is selected at step 104, the rendering stage will proceed to step 105, at which point it will render the next tile of the selected image. Once the tile has been rendered, the rendering stage will add the value "1" to the next tile index Ln for the selected image, at step 106, so that it is known to the system that the next tile to be rendered for that image is the tile at one position to the right of the tile in the image that was rendered at step 105.

It is then determined at step 106 whether or not all the next tile index values (L1, L2, L3 and L4 for the four images) indicate tiles that are all beyond the end of the row. If it is determined that at least one of them does not, then there are remaining tiles in the image(s) that need to be rendered for the row in question and the rendering stage will accordingly loop back to step 103 and repeat the subsequent rendering steps described above. If it is determined at step 107 that that all the index values L1, L2, L3 and L4 are beyond the end of the row, then the entire row of the first, second, third and fourth images has been rendered and the process will end for the row (step 108).

The process is then repeated for the next row of the images, and so on, until all the rows have been rendered.

As will be appreciated by those skilled in the art, the method of FIG. 10 can be applied to any number of images, i.e. applied to "n" arbitrary images, representing the same scene from any number of viewpoints (equal to or less than n).

In this case, each image could have an array of offset values On relative to a reference image of the n images, and a current tile index Ln, and for each image a target tile index Ln+On[Ln] would be determined, with the image having the lowest value of Ln+On[Ln] being selected to be rendered next. It can be seen from the above that the technology described herein, in its embodiments at least, facilitates more effective re-use of, e.g. cached, data when rendering two or more images, e.g. for the purpose of providing a stereoscopic display.

This is achieved, in the embodiments of the technology described herein at least, by determining a displacement between a first image and at least one other image of the two or more images, and using the displacement to control an aspect of the rendering of the images.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of rendering two or more images representing different views of the same scene, the method comprising:
   determining a displacement of content of the scene between a first image and at least one other image of the two or more images; and
   controlling an aspect of the rendering of the two or more images based on the determined displacement;
   wherein:
   the two or more images comprises a pair of images; and
   determining a displacement of content of the scene between a first image and at least one other image of the two or more images comprises determining a displacement of content of the scene between the first image and the second image of the pair of images; and
   the first image and the second image of the pair of images are each divided into a plurality of regions for the rendering process;
      the regions of the plurality of regions for a given image are rendered in turn with respect to the rendering of that image according to their position in a defined rendering order for the regions; and
      each region in a first image of the pair of images has associated with it a displacement that indicates the position in the rendering order of a corresponding region in the second image of the pair that has been determined to be where the content of the scene in the region of the first image has moved to in the second image of the pair;
   and the method comprises:
      determining for the next region to be rendered in the rendering order for the first image of the pair of images, the position in the rendering order for the second image of the pair of images of the corresponding region in the second image based on the displacement for the region of the first image;
      comparing the determined position in the rendering order of the corresponding region in the second image to the position in the rendering order of the next region to be rendered in the second image; and
      rendering the next region to be rendered in the rendering order in the first image, or rendering the next region to be rendered in the rendering order in the second image, based on the comparison.

2. The method of claim 1, wherein the displacement is a measure of the difference between the position of the content of the scene in the first image and the position of the content of the scene in the second image of the pair of images.

3. The method of claim 1, wherein a displacement is determined for plural regions of one of the images of the pair of images, where the displacement is determined with respect to content of the scene that is to be processed for rendering the regions in question.

4. The method of claim 3, wherein the displacement of an image region is determined using a depth measure for the image region.

5. The method of claim 3, wherein the first image and the second image of the pair of images are correspondingly divided into plural regions, and the displacement for an image region indicates by how many image regions the content of the image region has moved between the images.

6. The method of claim 3, wherein the regions for which a displacement is determined comprise respective processing tiles that the images are divided into for processing purposes.

7. The method of claim 1, wherein controlling an aspect of the rendering of the two or more images based on the determined displacement comprises using the displacement to select which image of the pair of images to render next.

8. The method of claim 1, wherein controlling an aspect of the rendering of the two or more images based on the determined displacement comprises using the determined displacement to control the order in which regions of the pair of images are rendered.

9. A graphics processing system comprising:
   rendering circuitry configured to render two or more images representing different views of the same scene;
   processing circuitry configured to determine a displacement of content of the scene between a first image and at least one other image of the two or more images; and
   processing circuitry configured to control an aspect of the rendering of the images based on the determined displacement;
   wherein:
   the two or more images comprises a pair of images; and
   determining a displacement between a first image and at least one other image of the two or more images comprises determining a displacement between the first image and the second image of the pair of images; and
   the first image and the second image of the pair of images are each divided into a plurality of regions for the rendering process;
      the regions of the plurality of regions for a given image are rendered in turn with respect to the rendering of that image according to their position in a defined rendering order for the regions; and
      each region in a first image of the pair of images has associated with it a displacement that indicates the position in the rendering order of a corresponding region in the second image of the pair that has been determined to be where the content of the scene in the region of the first image has moved to in the second image of the pair;
   and the system comprises processing circuitry configured to:
      determine for the next region to be rendered in the rendering order for the first image of the pair of images, the position in the rendering order for the second image of the pair of images of the corresponding region in the second image based on the displacement for the region of the first image;

compare the determined position in the rendering order of the corresponding region in the second image to the position in the rendering order of the next region to be rendered in the second image; and select as the next region to be rendered either the next region to be rendered in the rendering order in the first image, or the next region to be rendered in the rendering order in the second image, based on the comparison.

10. The system of claim 9, wherein the displacement is a measure of the difference between the position of the content of the scene in the first image and the position of the content of the scene in the second image of the pair of images.

11. The system of claim 9, wherein a displacement is determined for plural regions of one of the images of the pair of images, where the displacement is determined with respect to content of the scene that is to be processed for rendering the regions in question.

12. The system of claim 11, wherein the displacement of an image region is determined using a depth measure for the image region.

13. The system of claim 11, wherein the first image and the second image of the pair of images are correspondingly divided into plural regions, and the displacement for an image region indicates by how many image regions the content of the image region has moved between the images.

14. The system of claim 9, wherein the processing circuitry is configured to control an aspect of the rendering of the images based on the determined displacement by using the displacement to select which image of the pair of images to render next.

15. The system of claim 9, wherein the processing circuitry is configured to control an aspect of the rendering of the images based on the determined displacement by using the determined displacement to control the order in which regions of the first image and the second image of the pair of images are rendered.

16. The system of any one of claim 9, wherein the regions for which a displacement is determined comprise respective processing tiles that the images are divided into for processing purposes.

17. A non-transitory storage medium storing computer software code which when executing on at least one processor performs a method of rendering two or more images representing different views of the same scene, the method comprising:

determining a displacement of content of the scene between a first image and at least one other image of the two or more images; and controlling an aspect of the rendering of the two or more images based on the determined displacement;

wherein:

the two or more images comprises a pair of images; and determining a displacement of content of the scene between a first image and at least one other image of the two or more images comprises determining a displacement of content of the scene between the first image and the second image of the pair of images; and the first image and the second image of the pair of images are each divided into a plurality of regions for the rendering process;

the regions of the plurality of regions for a given image are rendered in turn with respect to the rendering of that image according to their position in a defined rendering order for the regions; and each region in a first image of the pair of images has associated with it a displacement that indicates the position in the rendering order of a corresponding region in the second image of the pair that has been determined to be where the content of the scene in the region of the first image has moved to in the second image of the pair;

and the method comprises:

determining for the next region to be rendered in the rendering order for the first image of the pair of images, the position in the rendering order for the second image of the pair of images of the corresponding region in the second image based on the displacement for the region of the first image;

comparing the determined position in the rendering order of the corresponding region in the second image to the position in the rendering order of the next region to be rendered in the second image; and rendering the next region to be rendered in the rendering order in the first image, or rendering the next region to be rendered in the rendering order in the second image, based on the comparison.

* * * * *